(12) United States Patent
Klicpera et al.

(10) Patent No.: US 10,803,268 B2
(45) Date of Patent: Oct. 13, 2020

(54) WIRELESS CHARGING ARRANGEMENTS ASSOCIATED WITH BARCODE READERS

(71) Applicant: Zebra Technologies Corporation, Lincolnshire, IL (US)

(72) Inventors: Christopher P. Klicpera, Westbury, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/193,928

(22) Filed: Nov. 16, 2018

(65) Prior Publication Data

US 2020/0160013 A1 May 21, 2020

(51) Int. Cl.
| | | |
|---|---|---|
| *G06K 7/10* | (2006.01) | |
| *G06K 7/14* | (2006.01) | |
| *H02J 50/10* | (2016.01) | |
| *H02J 50/90* | (2016.01) | |
| *H02J 7/02* | (2016.01) | |
| *H02J 7/34* | (2006.01) | |

(52) U.S. Cl.
CPC ....... *G06K 7/10821* (2013.01); *G06K 7/1413* (2013.01); *H02J 7/025* (2013.01); *H02J 50/10* (2016.02); *H02J 50/90* (2016.02); *H02J 7/345* (2013.01)

(58) Field of Classification Search
CPC ..... G06K 7/10881; G06K 2007/10524; G06K 9/22
USPC .......... 235/462.01, 462.45, 472.01
See application file for complete search history.

(56) References Cited

U.S. PATENT DOCUMENTS

| | | | |
|---|---|---|---|
| 9,478,113 B2 * | 10/2016 | Xie | G08B 13/242 |
| 10,025,966 B1 | 7/2018 | Volta et al. | |
| 10,397,966 B1 * | 8/2019 | DiGiovanna | H04B 5/0087 |
| 2011/0290889 A1 * | 12/2011 | Tamburrini | G06K 7/10881 235/470 |
| 2012/0097745 A1 * | 4/2012 | Brock | G06K 7/10881 235/472.02 |
| 2012/0319645 A1 * | 12/2012 | O'Donnell | H02J 7/025 320/108 |
| 2018/0285613 A1 | 10/2018 | Volta et al. | |
| 2018/0293412 A1 * | 10/2018 | Volta | G07G 1/0045 |

\* cited by examiner

*Primary Examiner* — Daniel St. Cyr
(74) *Attorney, Agent, or Firm* — Yuri Astvatsaturov (57) ABSTRACT

A method and arrangement for wirelessly charging a barcode reader in a base station is disclosed. The barcode reader and base station each have an induction coil. The induction coil in the base station is electrically coupled to an electric power source, and generates an electromagnetic field. The induction coil in the barcode reader is electrically coupled to a power storage component. The barcode reader is configured to rest on the base station. When the barcode reader is resting on the base station, the induction coil in the barcode reader is exposed to the electromagnetic field, and a current is induced in the induction coil in the barcode reader. A positioning feature of the base station constrains movement of the barcode reader along a first plane, and permits rotation of the barcode reader about a vertical axis that is substantially normal to the first plane.

43 Claims, 9 Drawing Sheets

WIRELESS CHARGING ARRANGEMENTS ASSOCIATED WITH BARCODE READERS

BACKGROUND OF THE INVENTION

Conventional wireless barcode readers are charged in a charging base station using metallic charging contacts that directly contact metallic contacts in the base station, which are, in turn, connected to an electrical source. This direct, wired method of charging requires the metallic contacts to be exposed, thereby subjecting them to wear and breakage. Further, dirt, dust and liquid may get into the charging contacts, thereby requiring periodic cleaning of the contacts, which was difficult, and presenting additional challenges for sealing the charging contacts to protect electrical components inside the base station housing. When the barcode reader is docked in conventional base stations to align the charging contacts, the barcode scanner is typically locked into a fixed field-of-view (FOV), which is not always conducive for scanning certain items. In addition, these conventional charging base stations have a large footprint and require cabling to run over the workstation surface, thereby limiting the amount of available workstation surface and limiting placement of the base station on the workstation surface. Still further, some of these conventional base stations contributed to the Z-height of the docked barcode reader (i.e., the total combined height of the barcode reader and base station above the workstation surface), which compromises the docking and undocking of the barcode reader in tight spaces.

Accordingly, there is a need for a wireless charging base station with a reduced form factor, that enables a dynamic FOV for the barcode reader while the barcode reader is docked within the base station, and aligns the barcode reader with the base station to charge the barcode reader wirelessly.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides an arrangement that includes a barcode reader and a base station. The barcode reader includes a head portion housing an imaging assembly, a handle portion extending along a centroidal axis, and a base portion connected to the head portion via the handle portion. The imaging assembly has a field of view (FOV) with a central FOV axis, and the centroidal axis is obliquely angled relative to the central FOV axis. The base portion has a top surface and a bottom surface, the top surface being closer to the head portion than the bottom surface, wherein at least a first portion of the bottom surface is substantially flat and extends along a first plane. The centroidal axis of the handle portion is obliquely angled relative to the first plane. The base portion houses a first induction coil positioned proximate a second portion of the bottom surface, and the first induction coil is electrically coupled to a power storage component housed within the barcode reader. The base station includes a base station surface, houses a second induction coil positioned proximate a second portion of the base station surface, and includes a positioning feature. At least a first portion of the base station surface is substantially flat and extends along a second plane that is substantially parallel to the first plane. The second induction coil is electrically coupled to an electric power source. The barcode reader is configured to rest on the base station such that the second portion of the bottom surface of the base portion is positioned in close enough proximity to the second portion of the base station surface to cause an electromagnetic field created by the second induction coil to induce a current in the first inductive coil. The barcode reader is further configured to rest on the base station such that the positioning feature on the base station: (i) constrains movement of the base portion of the barcode reader along the first plane, and (ii) permits rotation of the base portion of the barcode reader about a vertical axis, where the vertical axis is substantially normal to the first plane.

Another aspect of the present disclosure provides a method of charging and operating a barcode reader in a resting state within the base station. The barcode reader includes: i) a base portion having a bottom surface, where at least a first portion of the bottom surface is substantially flat and extends along a first plane, and ii) a first induction coil is positioned proximate a second portion of the bottom surface, where the first induction coil is electrically coupled to a power storage component housed within the barcode reader. The base station includes: i) a base station surface, wherein at least a first portion of the base station surface is substantially flat and extends along a second plane that is substantially parallel to the first plane, ii) a second induction coil positioned proximate a second portion of the base station surface, where the second induction coil is electrically coupled to an electric power source, and iii) a positioning feature. The method includes positioning the second portion of the bottom surface of the barcode reader in close enough proximity to the second portion of the base station surface to cause an electromagnetic field created by the second induction coil to induce a current in the first induction coil, constraining movement of the barcode reader along the first plane via an interface between the barcode reader and the positioning feature of the base station, permitting rotation of the barcode reader about a vertical axis via the interface between the barcode reader and the positioning feature of the base station, the vertical axis being substantially normal to the first plane, and capturing at least one of: light reflected from a symbol and light emitted from the symbol via an imaging assembly of the barcode scanner.

A further aspect of the present disclosure provides an arrangement that includes a barcode reader and a base station. The barcode reader includes a body portion and a base portion connected to the body portion. The body portion has a front side with a window, a rear side opposite the front side and two lateral sides, and houses an imaging assembly. The imaging assembly has a field of view (FOV) with a central FOV axis extending through the window. The base portion has a top surface and a bottom surface, the top surface being closer to the body portion than the bottom surface. At least a first portion of the bottom surface is substantially flat and extends along a first plane. The base portion houses a first induction coil positioned proximate a second portion of the bottom surface. The first induction coil is electrically coupled to a power storage component housed within the barcode reader. The base station includes a base station surface. At least a first portion of the base station surface is substantially flat and extends along a second plane that is substantially parallel to the first plane. The base station houses a second induction coil positioned proximate a second portion of the base station surface, and the second induction coil is electrically coupled to an electric power source. The base station further has a positioning feature. The barcode reader is configured to rest on the base station such that the second portion of the bottom surface of the base portion is positioned in close enough proximity to the second portion of the base station surface to cause an electromagnetic field created by the second induction coil to induce a current in the first inductive coil. The barcode reader is further configured to rest on the base station such that the positioning feature on the base station: (i) constrains movement of the base portion of the barcode reader along the first plane, and (ii) permits rotation of the base portion of the barcode reader about a vertical axis that is substantially normal to the first plane.

Figure 1A:
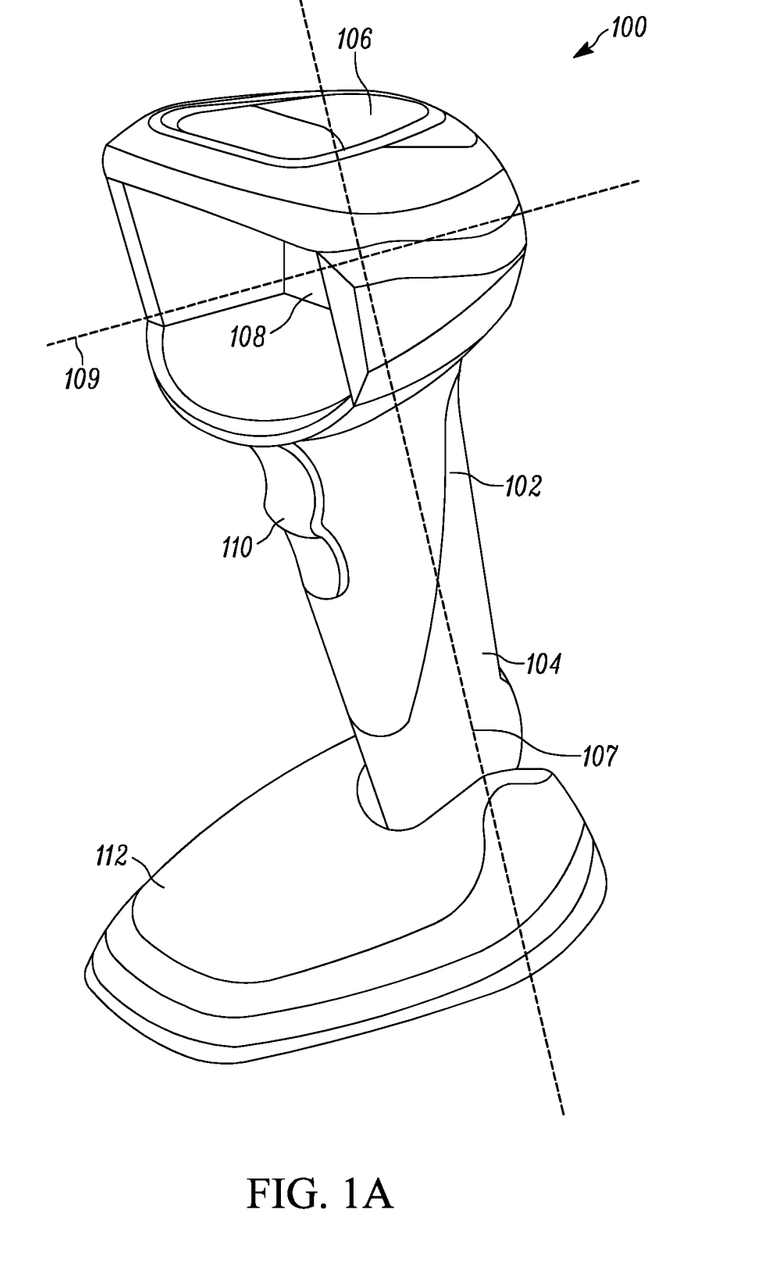
FIG. 1A is a perspective front and side view of an optical imaging reader in accordance with an embodiment.
Figure 1B:
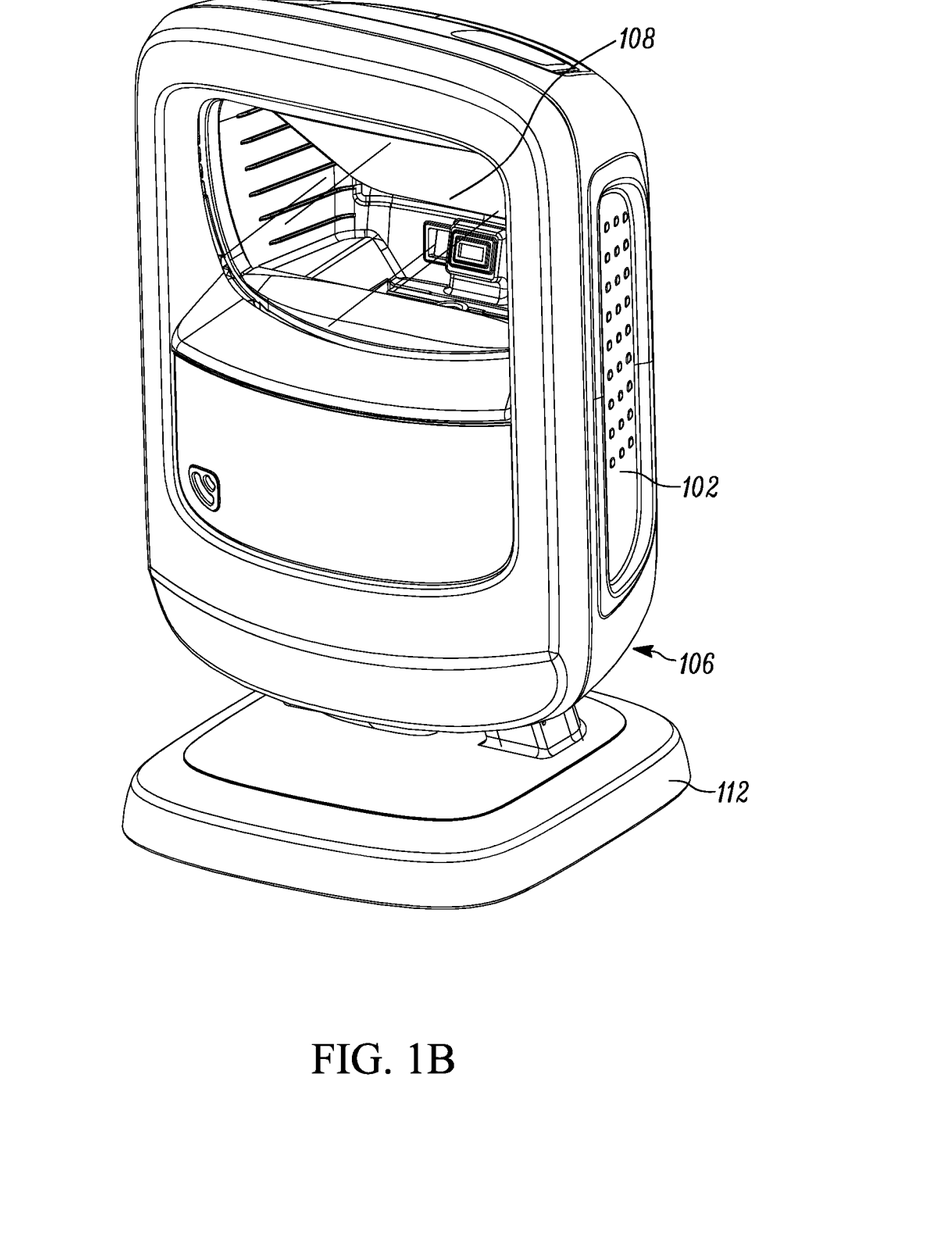
FIG. 1B is a perspective front and side view of an optical imaging reader in accordance with another embodiment.
Figure 2:
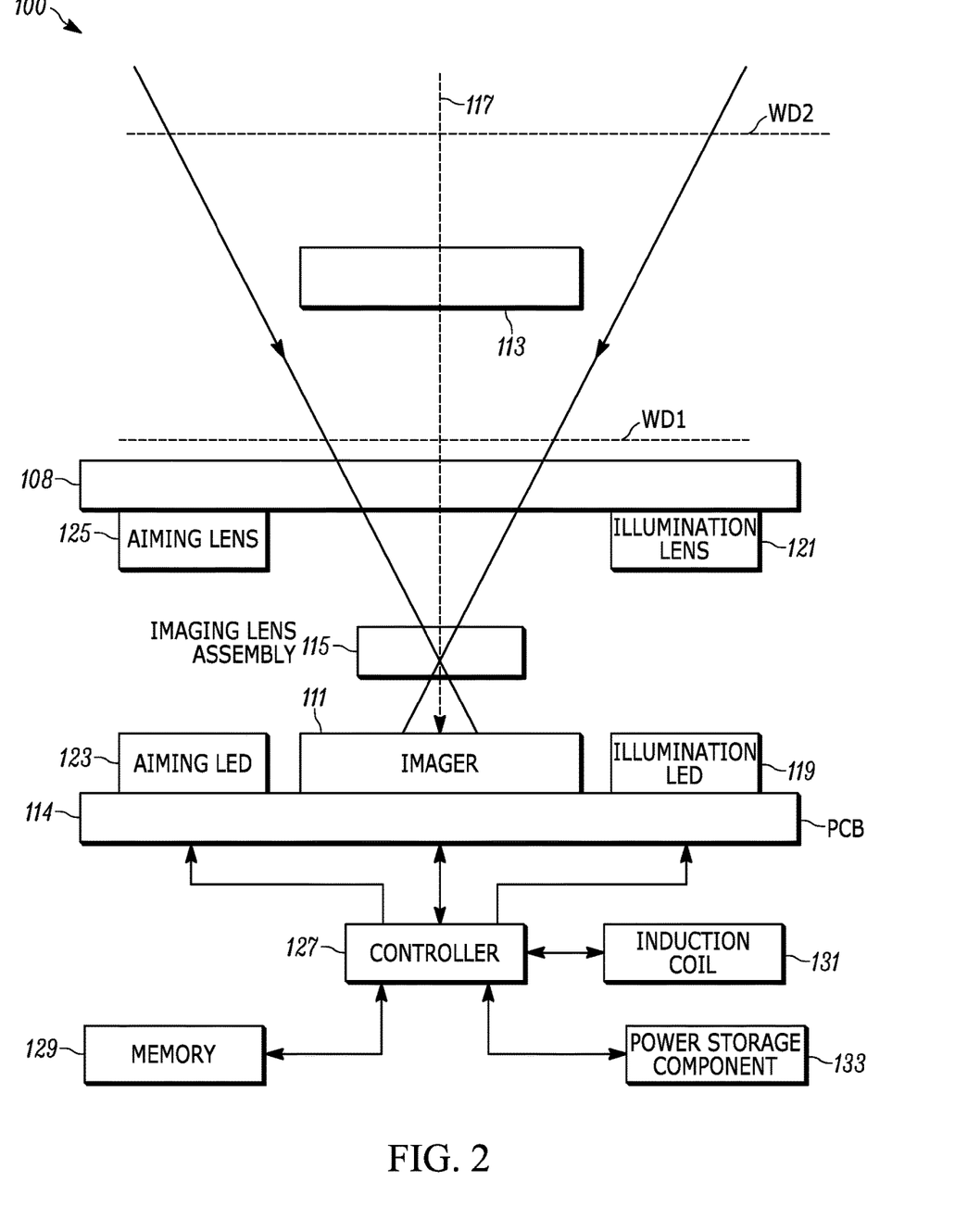
FIG. 2 is a schematic of various components of the reader of FIG. 1A.

FIGS. 1 and 2 are exemplary embodiments of an optical imaging reader 100 and the components thereof. Referring now to the drawings, FIG. 1 illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Included in the embodiment is also a base 112, also referred to as a base portion, attached to the handle portion 104 opposite the head portion 106. The base portion 112 is configured to stand on a surface and support the housing 102 in a generally upright position. The barcode reader 100 can be used in a hands-free mode as a stationary workstation when it is placed on a countertop or other workstation surface. The barcode reader 100 can also be used in a handheld mode when it is picked up off the countertop or base station, and held in an operator's hand. In the hands-free mode, products can be slid, swiped past, or presented to the window 108. In the handheld mode, the barcode reader 100 can be moved towards a barcode on a product, and the trigger 110 can be manually depressed to initiate imaging of the barcode.

Other implementations may provide only handheld or only hands-free configurations. In the embodiment of FIG. 1A, the reader 100 is ergonomically configured for a user's hand as a gun-shaped housing 102, though other configurations may be utilized as understood by those of ordinary skill in the art. As shown, the lower handle 104 extends below and rearwardly away from the body 102 along a centroidal axis 107 obliquely angled relative to a central field of view axis 109 of a field of view of an imaging assembly within the scanning head 102. In the embodiment of FIG. 1B, the lower handle 104 is omitted, and the body 102 has front and back sides, and lateral sides, with the window 108 in the front side, such that a user is able to grip the reader 100 with one hand via the lateral sides.

For any of the reader embodiments, an imaging assembly includes a light-detecting sensor or imager 111 operatively coupled to, or mounted on, a printed circuit board (PCB) 114 in the reader 100 as shown in FIG. 2. In an embodiment, the imager 111 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 115 over a field of view along an imaging axis 117 through the window 108 in either mode of operation. The return light is scattered and/or reflected from a target 113 over the field of view. The imaging lens assembly 115 is operative for focusing the return light onto the array of image sensors to enable the target 113 to be read. The target 113 may be located anywhere in a working range of distances between a close-in working distance (WD1) and a far-out working distance (WD2). In a preferred embodiment, WD1 is about one-half inch from the window 106, and WD2 is about thirty inches from the window 106.

An illuminating light assembly is also mounted in the imaging reader 100. The illuminating light assembly includes an illumination light source, such as at least one light emitting diode (LED) 119 and at least one illumination lens 121, and preferably a plurality of illumination LEDs and illumination lenses, configured to generate a substantially uniform distributed illumination pattern of illumination light on and along the target 113 to be read by image capture. At least part of the scattered and/or reflected return light is derived from the illumination pattern of light on and along the target 113.

An aiming light assembly is also mounted in the imaging reader 100 and preferably includes an aiming light source 123, e.g., one or more aiming LEDs, and an aiming lens 125 for generating and directing a visible aiming light beam away from the reader 100 onto the target 113 in the handheld mode. The aiming light beam has a cross-section with a pattern, for example, a generally circular spot or cross-hairs for placement at the center of the target 113 as shown in FIG. 2, or a line for placement across the target 113, or a set of framing lines to bound the field of view, to assist an operator in visually locating the target 113 within the field of view prior to image capture.

As also shown in FIG. 2, the imager 111, the illumination LED 119, and the aiming LED 123 are operatively connected to a controller or programmed microprocessor 127 operative for controlling the operation of these components. A memory 129 is connected and accessible to the controller 127. Preferably, the microprocessor 127 is the same as the one used for processing the captured return light from the illuminated target 113 to obtain data related to the target 113.

In addition, the controller 127 functions as a power management circuit that electrically couples an induction coil 131 to a power storage component 133, such as a rechargeable battery or capacitor. In another embodiment, a separate circuit is provided as the power management circuit. In either embodiment, power management includes, but it not limited to an AC/DC conversion component, voltage conditioner component, etc. It will also be understood by those of ordinary skill in the art that the term "electrically coupled" includes directly connected or indirectly connected, such that the induction coil 131 may be directly connected to the power storage component 133, or indirectly connected to the power storage component 133 including through any intervening components, such as the power management circuit and/or controller 127.

FIGS. 3-6 depict various possible embodiments of the reader 100 in conjunction with a base station. In each embodiment, the base station houses an induction coil operatively coupled to a control circuit, which causes a current to be applied to the induction coil, which, in turn, causes the induction coil to generate an alternating electromagnetic field. The control circuit includes a cable connector to connect to a cable in order to receive power and generate the current in the induction coil, and for communicating with a host computing system. In an embodiment, the control circuit is a gateway between the host computing system and the reader 100.

When the induction coil 131 of the reader 100 is introduced to the electromagnetic field, such as when the base portion 112 of the reader 100 is resting on the base station, a current is induced in the induction coil 131, which, in turn, is used to charge the power storage component 133. In addition, the base station has a positioning feature that constrains lateral movement of the reader 100 when the base portion 112 of the reader 100 is resting on the base station, while also permitting at least some (if not full) rotational movement of the base portion 112. Still further, the handle portion 104 may be removably coupled to the base portion 112.

Figure 3:
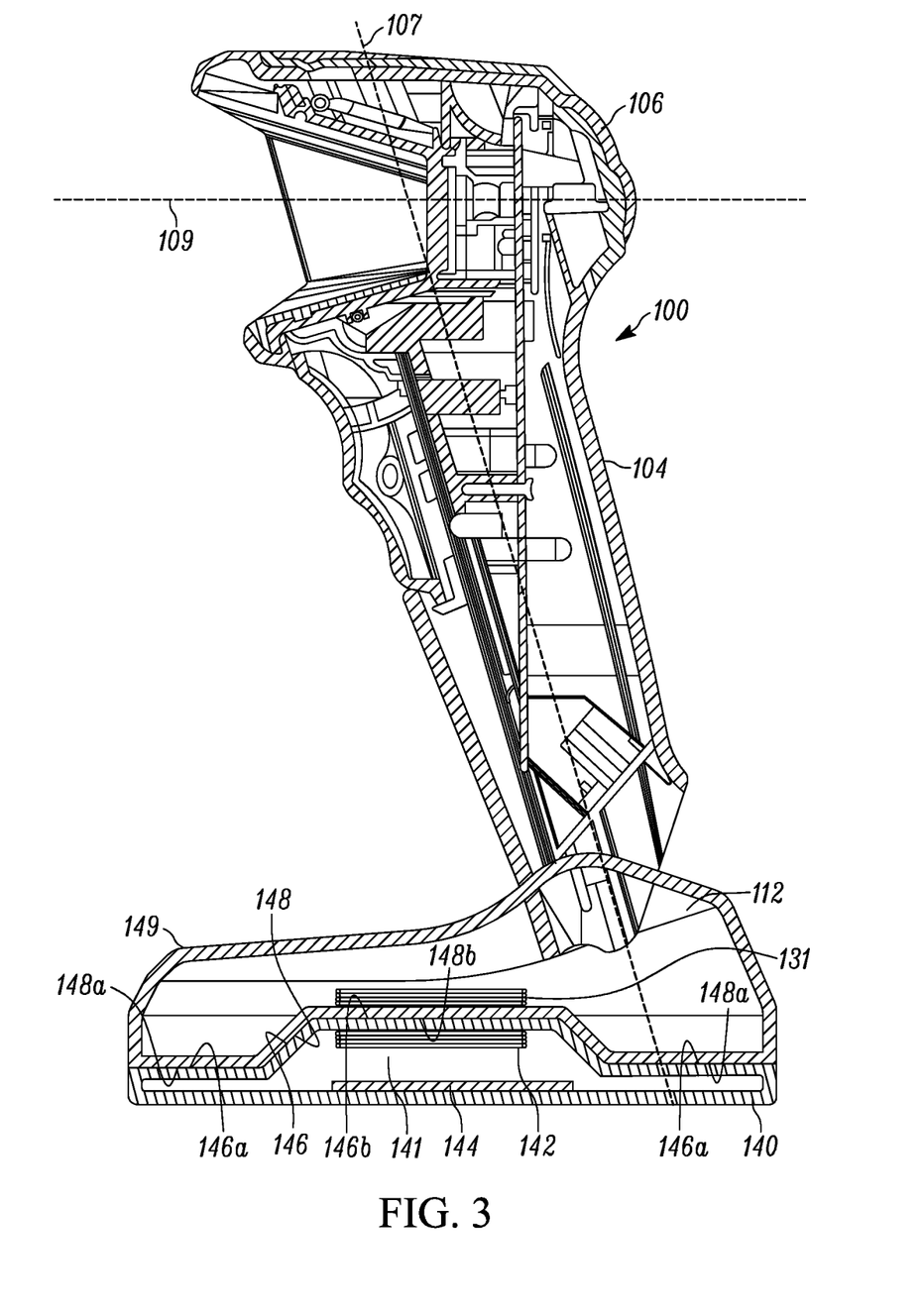
FIG. 3 is cross-sectional side view the reader of FIG. 1A with an embodiment of a base portion and a base station.

Referring to FIG. 3, an embodiment of a base station 140 is disclosed, in which the base station 140 is configured for placement on a countertop or other substantially flat workstation support surface and has a raised, convex positioning feature 141. The base station 140 houses an induction coil 142 operatively coupled to a control circuit 144. As compared to other embodiments disclosed herein, the embodiment shown in FIG. 3 does not involve any modification to the countertop nor involve additional mounting hardware, and provides minimal distance between the induction coils for greater efficiency in charging. Further, the embodiment of FIG. 3 has a lower Z-height than conventional reader/base station systems. However, it is noted that this embodiment also has a higher Z-height than other disclosed embodiments, uses a base station with a higher Z-height than other disclosed embodiments due to the positioning feature 141, and has a thicker base portion 112 in order to accommodate the positioning feature 141 of the base station 140.

The base station 140 includes a base station surface 146 having a first portion 146a and a second portion 146b. Generally speaking, the second portion 146b of the base station surface 146 is at least partly displaced from the first portion 146a so as to form a convex positioning feature 141, such that positioning the bottom surface 148 of the base portion 112 of the reader 100 on the base station surface 146 prevents the base portion 112 from laterally moving off the base station 140 or otherwise misaligning the induction coils 131, 142. In an embodiment, the cross-section of the positioning feature 141 along a plane parallel with the first portion 146a is circular, thereby forming a cylindrical, conical or frustoconical positioning feature 141 in the base station 140. Those of ordinary skill in the art will understand that the positioning feature 141 may be formed as other shapes, such as a spherical segment or ring. As yet another example, the positioning feature 141 may have a circular sector cross-section, such as a wedge. As a still further example, the positioning feature 141 may be a cylindrical, spherical segment, conical or frustoconical shape that fits into a recess in the center of the indication coil 131 of the base portion 112.

The base portion 112 has a bottom surface 148 and a top surface 149. In this embodiment, the bottom surface 148 includes a first portion 148a and a second portion 148b. The first portion 148a of the bottom surface 148 and the first portion 146a of the base station surface 146 are each substantially flat and extend along parallel planes in order to provide a stable interface between the base portion 112 and the base station 140. As seen in FIG. 3, the first portion 148a of the bottom surface 148 of the base portion 112 is at an oblique angle relative to the centroidal axis 107 of the handle portion 104, though in another embodiment in which the handle portion 104 is omitted, the first portion 148a of the bottom surface 148 of the base portion is perpendicular to the centroidal axis of the body 102.

The second portion 148a of the bottom surface 148 is configured to engage with the second portion 146a of the base station surface 146 so as to align the induction coils 131, 142 and place them proximate to one another. In particular, the induction coil 142 in the base station 140 is positioned proximate the second portion 146b of the base station surface 146 and the induction coil 131 of the base portion 112 is positioned proximate the second portion 148b of the bottom surface 148, such that when the base portion 112 is positioned on the base station 140, the electromagnetic field generated by the induction coil 142 in the base station 140 causes a current to be generated in the induction coil 131 in the base portion 112. As will be understood, the material used to manufacture the housing of the base station 140 and the base portion 112 provides minimal interference to the electromagnetic field, and the thickness of the housings is sufficient to position the induction coil 131 of the base portion 112 within the electromagnetic field generated by the induction coil 142 in the base station 140.

Further, the convex positioning feature 141 of the base station 140 is configured to be received by a corresponding concave receiving positioning feature in the bottom surface 148 of the base portion 112. Again, the convex positioning feature 141 of the base station 140 may be cylindrical, conical, frustoconical, spherical segment, ring, circular sector or any other shape, including shapes that fit into a recess in the center of the indication coil 131 of the base portion 112, and a corresponding concave receiving positioning feature in the bottom surface 148 allows the base portion 112 to rotate while seated on the base station 140. However, it should be understood that the convex shape of the positioning feature 141 and the concave shape of the receiving positioning feature within the bottom surface 148 need not correspond to one another in order to align the induction coils 131, 142 or restrain lateral movement of the base portion 112 with respect to the base station 140. For example, a circular sector-shaped positioning feature 141, may engage with, and span, a cylindrical-shaped concave feature in the bottom surface 148 of the base portion 112 while still restraining the base portion laterally yet permitting rotation of the base portion 112. In another example, a circular sector-shaped convex positioning feature 141 in the base station 140 may engage with a circular sector-shaped concave feature in the bottom 148 of the base portion 112, where the total central angle of both sectors is less than 360°, so as to permit less than 360° rotation and/or at least 45° rotation of the base portion 112 on the base station 140.

Figure 4:
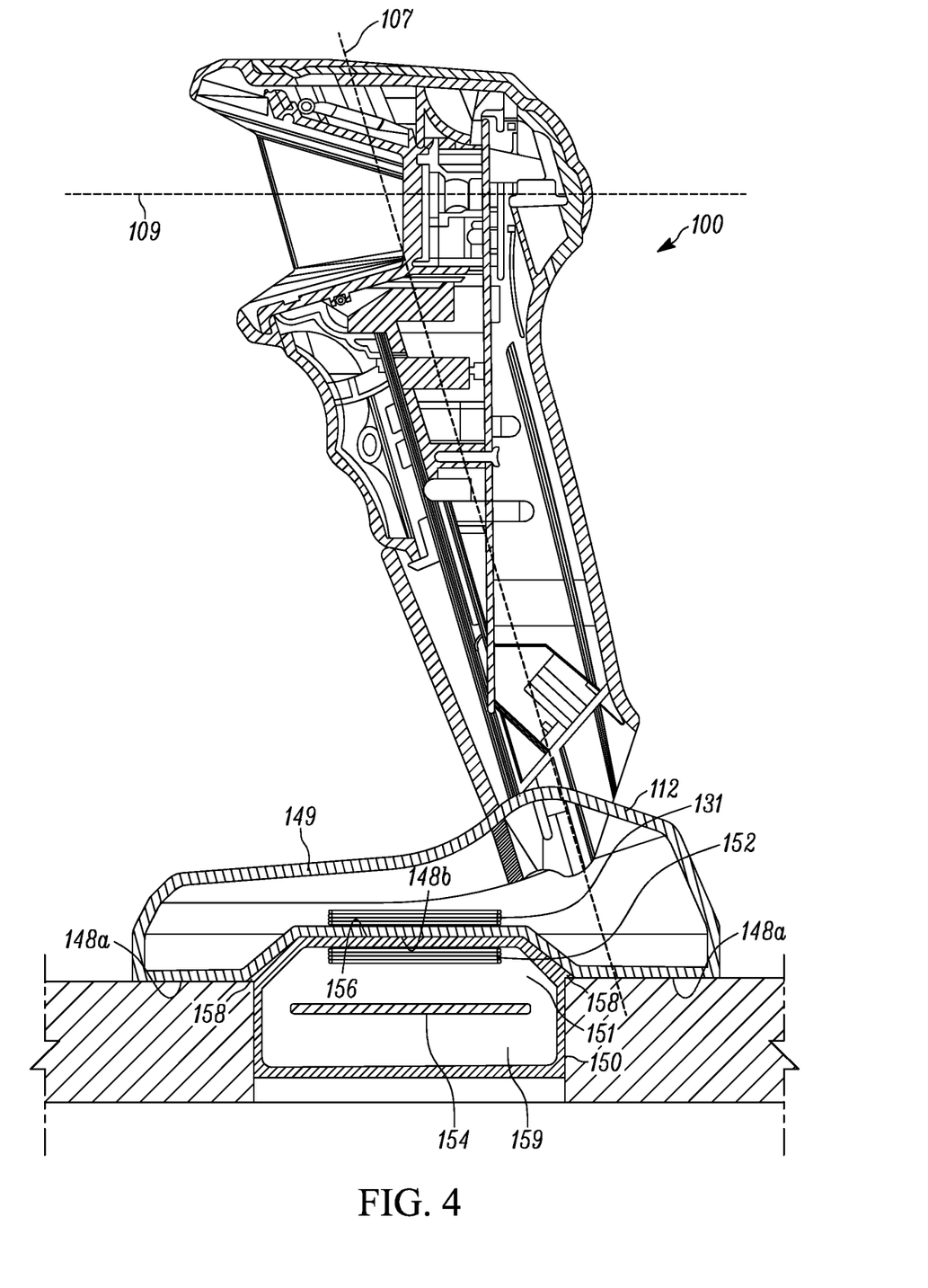
FIG. 4 is cross-sectional side view of the reader of FIG. 1A with another embodiment of a base portion and a base station.

Referring to FIG. 4, another embodiment of a base station 150 is disclosed, in which the base station 150 is configured for partial placement within a countertop or other substantially flat support surface. Like the embodiment depicted in FIG. 3, the base station 150 has a raised, convex positioning feature 151 that protrudes above the surface of the countertop. The base station 150 houses an induction coil 152 operatively coupled to a control circuit 154. As compared to other embodiments disclosed herein, the embodiment shown in FIG. 4 may require modification to the countertop, namely a hole in the countertop in which to "drop in" the base station 150, but does not require additional mounting hardware and utilizes less area on the countertop. Similar to the embodiment of FIG. 3, the embodiment of FIG. 4 has minimal distance between the induction coils for greater efficiency in charging, but also has a higher Z-height than other disclosed embodiments. Further, the base station has a higher Z-height than other embodiments due to the positioning feature 151, and has a thicker base portion 112 in order to accommodate the positioning feature 151 of the base station 150.

The base station 150 includes a base station surface 156. Rather than having a first portion and a second portion, the base station surface 156 extends along a single plane. Generally speaking, the base station surface 156 is at least partly displaced from the surface of the countertop so as to form the convex positioning feature 151, such that positioning the bottom surface 148 of the base portion 112 of the reader 100 on the base station surface 156 prevents the base portion 112 from laterally moving off the base station 150 or otherwise misaligning the induction coils 131, 152. As with the embodiment of FIG. 3, the cross-section of the positioning feature 151 along a plane parallel with the countertop is circular, thereby forming a cylindrical or frustoconical positioning feature 151 in the base station 150. Those of ordinary skill in the art will understand that the positioning feature 151 may be formed as other shapes, such as a spherical segment or ring. As yet another example, the positioning feature 151 may have a circular sector cross-section, such as a wedge.

Again, the base portion 112 has a bottom surface 148 and a top surface 149, where the bottom surface 148 includes a first portion 148a and a second portion 148b. The second portion 148b of the bottom surface 148 and the base station surface 156 are each substantially flat and extend along parallel planes in order to provide a stable interface between the base portion 112 and the base station 150. In this embodiment, the countertop, which is generally substantially flat and extends along a parallel plane as the first portion 148a of the bottom surface provides an additional stable interface between the base portion 112 and the base station 150.

Similar to the embodiment of FIG. 3, the second portion 148b of the bottom surface 148 is configured to engage with the base station surface 156 so as to align the induction coils 131, 152 and place them proximate one another. In particular, the convex positioning feature 151 of the base station 150 is configured to be received by a corresponding concave receiving positioning feature in the bottom surface 148 of the base portion 112. However, in this particular embodiment, the base station 150 includes a flange 158 extending from the base station surface 156 and away from the body 159 of the base station 150 in a plane parallel to the bottom surface 148, the countertop surface and the base station surface 156. The base station body 159 fits within the hole of the countertop, and the flange 158 is of a dimension larger than the hole in order to retain the base station 150 within the hole with the positioning feature 151 above the countertop surface. In an alternative embodiment, or as an additional feature of the embodiment of FIG. 4, a flange may extend from the base station body 159 underneath the counter and attached to the underside of the counter using mechanical fasteners (e.g., nuts, bolts, adhesive, etc.) in order to maintain the base station body 159 within the hole in the countertop.

Also similar to the embodiment of FIG. 3, the induction coil 152 in the base station 150 is positioned proximate the base station surface 156 and the induction coil 131 of the base portion 112 is positioned proximate the second portion 148b of the bottom surface 148, such that when the base portion 112 is positioned on the base station 150, the electromagnetic field generated by the induction coil 152 in the base station 150 causes a current to be generated in the induction coil 131 in the base portion 112. Interaction between the induction coils 131, 152 is facilitated by the bottom surface 148 of the base portion 112 having a concave receiving positioning feature corresponding to the convex positioning feature 151 of the base station 150. Again, however, it should be understood that the convex shape of the positioning feature 151 and the concave shape of the receiving positioning feature within the bottom surface 148 need not correspond to one another in order to align the induction coils 131, 152 or restrain lateral movement of the base portion 112 with respect to the base station 150, example of which were provided above.

Figure 5A:
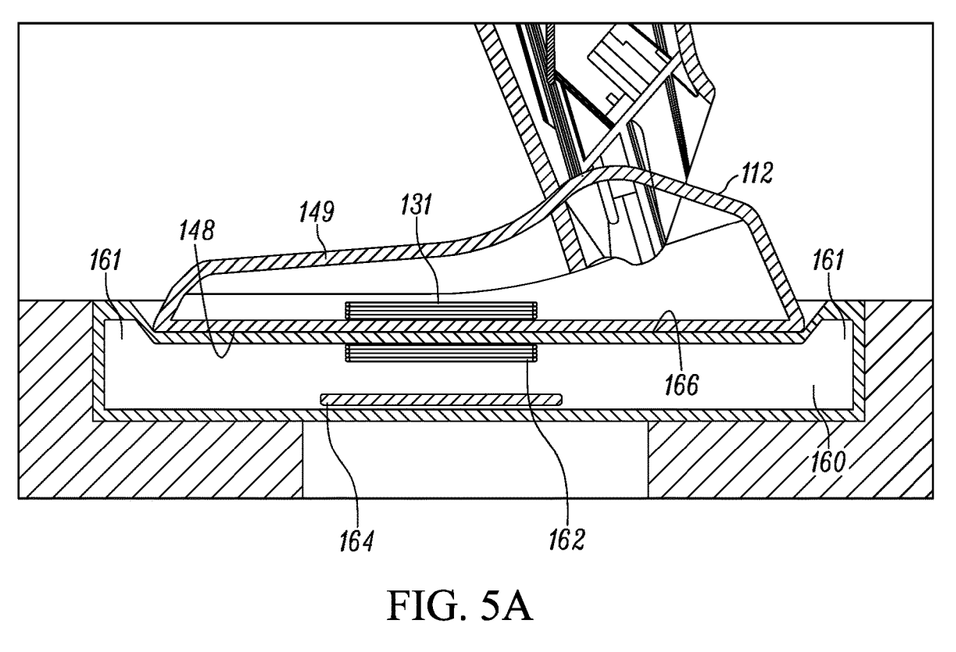
FIG. 5A is a cross-sectional side view of the reader of FIG. 1A with a further embodiment of a base portion and a base station.
Figure 5B:
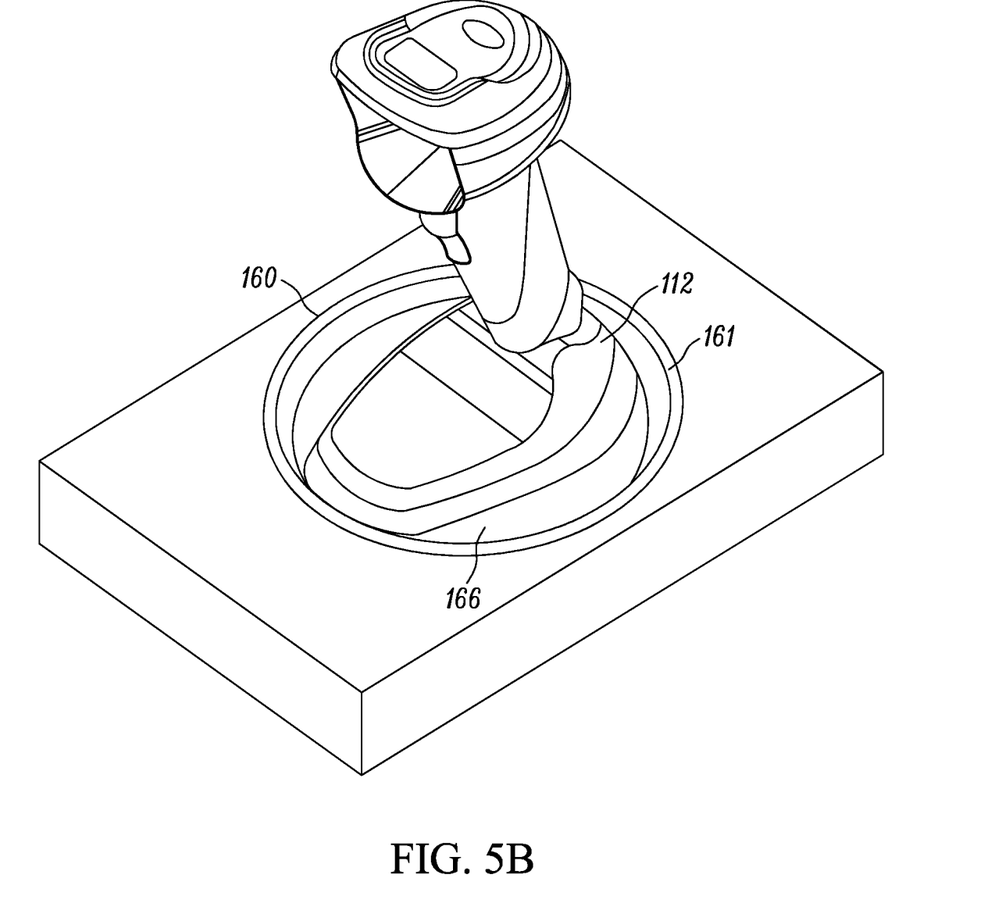
FIG. 5B is a perspective, top and side view of the embodiment of FIG. 5A.

Referring to FIGS. 5A and 5B, a further embodiment of a base station 160 is disclosed, in which the base station 160 is configured for placement within a countertop or other substantially flat support surface. Unlike the embodiments depicted in FIGS. 3 and 4, the base station 160 has a flanged positioning feature 161 that encircles the base portion 112 when the base portion 112 is resting on the base station 160. The base station 160 houses an induction coil 162 operatively coupled to a control circuit 164. The embodiment shown in FIGS. 5A and 5B may require modification to the countertop, namely a hole in the countertop in which to drop in the base station 160. In an embodiment, the hole in the countertop is counterbored to provide a coaxial hole through which to run a cable that connects with the control circuit 164, and a counterbore in which the base station 160 is seated. In another embodiment, the base station 160 is mounted on a gimbal, in order to allow the base portion 112 to tilt relative to the countertop while the base portion 112 remains rested on the base station 160. In operation, the reader 100 is hand-tilted relative to the countertop by a user while reader 100 is rested on the base station. The gimbal may allow the reader 100 to remain tilted relative to the countertop when the user releases the reader 100, or the gimbal may return the reader 100 to its original position relative to the countertop.

Similar to the embodiments of FIGS. 3 and 4, the embodiment of FIGS. 5A and 5B has minimal distance between the induction coils for greater efficiency in charging, but also has a lower Z-height overall than other disclosed embodiments. For example, the positioning feature 161 of the base station provides no contribution to the overall Z-height. The base portion 112 is also thinner as it does not need to accommodate the positioning feature 161 of the base station 160. Although there is some modification to the countertop, the base station 160 may simply be "dropped in" without any additional mounting hardware.

The base station 160 includes a substantially flat base station surface 166 that extends in a single plane parallel to the plane of the countertop. Generally speaking, the base station surface 166 is at least partly displaced from the surface of the countertop so as to keep the positioning feature 161 flush with the countertop, and to position the bottom surface 148 of the base portion 112 of the reader 100 on the base station surface 166. The positioning feature 161 prevents the base portion 112 from laterally moving off the base station 160 or otherwise misaligning the induction coils 131, 162 encircling the bottom surface 148 of the base portion 112. In this embodiment, the positioning feature 161 forms a raised ring about the base portion 112, thereby allowing full rotation of the base portion 112 while seated on the base station 160.

The base portion 112 has a bottom surface 148 and a top surface 149. In this embodiment, the bottom surface 148 extends along a single plane parallel to the base station surface 166. The bottom surface 148 and the base station surface 166 are each substantially flat in order to provide a stable interface between the base portion 112 and the base station 160. In at least one dimension, the bottom surface 148 spans the diameter of the base station surface 166 such that the flanged positioning feature 161 prevents lateral movement of the base portion, and aligns the induction coils 131, 162. The induction coil 162 in the base station 160 is positioned proximate the base station surface 166 and the induction coil 131 of the base portion 112 is positioned proximate the bottom surface 148, such that when the base portion 112 is positioned on the base station 160, the electromagnetic field generated by the induction coil 162 in the base station 160 causes a current to be generated in the induction coil 131 in the base portion 112.

Figure 6:
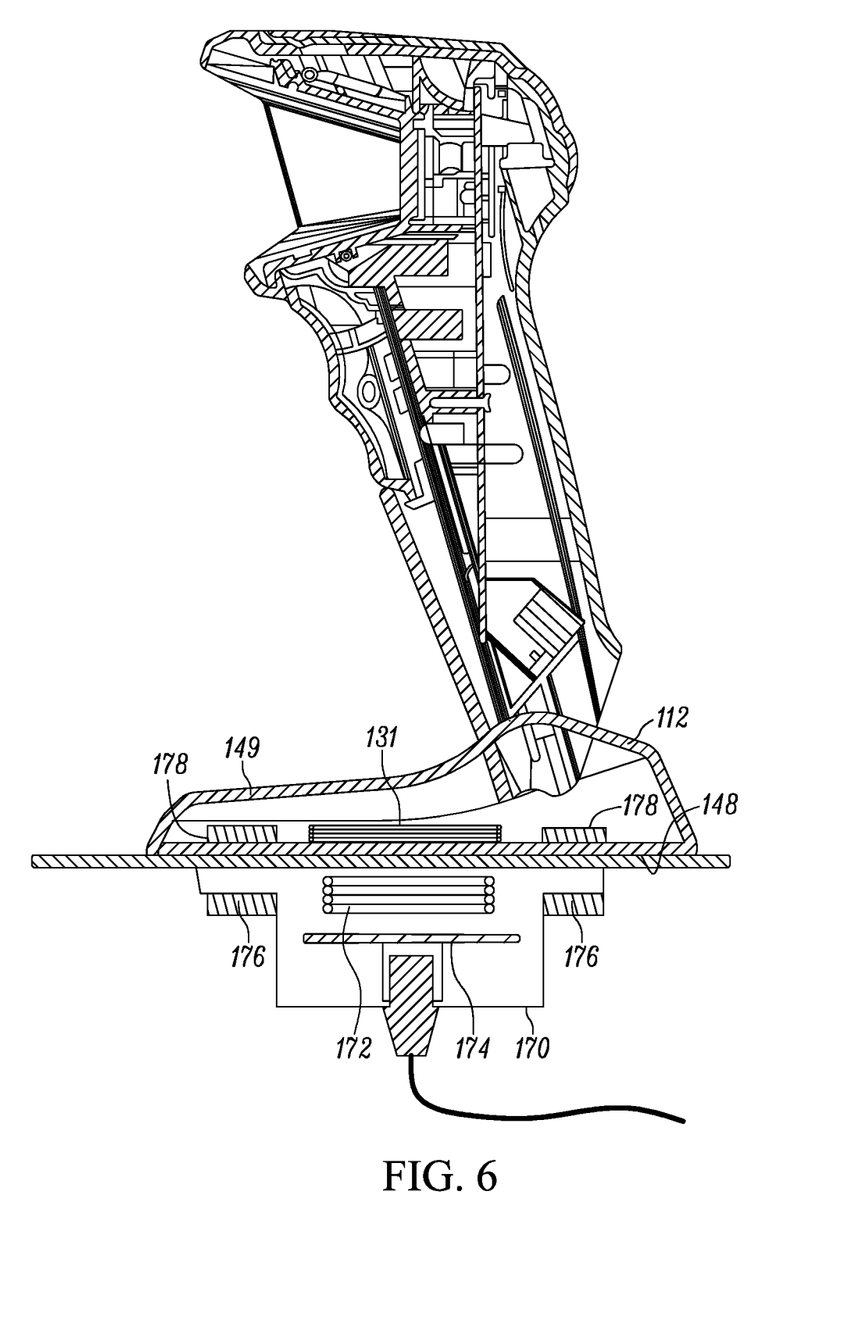
FIG. 6 is a cross-sectional side view of the reader of FIG. 1 with a yet further embodiment of a base portion and a base station.

Referring to FIG. 6, a yet further embodiment of a base station 170 is disclosed, in which the base station 170 is configured for placement beneath the countertop or other substantially flat support surface with no exposure above the countertop. Unlike the previously-described embodiments, the base station 170 has no direct contact with the base portion 112. The base station 170 houses an induction coil 172 operatively coupled to a control circuit 174. The embodiment shown in FIG. 6 requires little to no modification to the countertop. Rather, the base station 170 is mounted to the underside of the countertop, using screws, adhesives or other mechanical fasteners. It is noted that because the base station 170 does not make direct contact with the base portion 112, the countertop bears the weight of the reader 100 and protects the base station 170 without any additional sealing. As such, it is possible that only a mildly strong adhesive, such as adhesive tape, is used to mount the base station 170. However, it is further noted that the countertop or other workstation surface should be thin enough to minimize the distance between the induction coils as much as possible, given that this embodiment creates a longer distance between the induction coils, which, in turn, decreases charging efficiency. In addition, the countertop should be made of a material (e.g., non-metallic) that does not interfere with the electromagnetic field generated by the induction coil of the base station 170.

Similar to the embodiment of FIGS. 5A and 5B, the embodiment of FIG. 6 has a lower Z-height overall than other disclosed embodiments. The positioning feature in this embodiment is replaced with alignment feature 176, where the alignment feature 176 of the base station 170 provides no Z-height contribution to the overall arrangement. It should be noted, however, that a positioning feature of any of the above embodiments may also be utilized. The base portion 112 is also thinner as it does not need to physically accommodate the alignment feature 176 of the base station 170. However, in this case there is no downward force placed on the base station 170 by the reader 100, and the bottom surface 148 of the base portion 112 interfaces with the countertop. In an embodiment, both the bottom surface 148 of the base portion 112 and the countertop are substantially flat, and each extends in a single plane parallel to one another.

In this embodiment, the alignment feature is at least one magnet 176 housed in the base station 170. The base portion 112 has at least one corresponding element 178 that is ferromagnetic, such as a metallic plate or a magnet of opposite polarity to the magnet 176 in the base station 170. In an embodiment, each of the magnets 176, 178 are rings that align with one another, and, in turn, align the induction coils 131, 172, yet permit rotation of the base portion 112 on the countertop, albeit with greater friction that the above embodiments. In any case, the magnets 176, 178 align and maintain alignment of the induction coils 131, 172. The attraction between the magnets 176, 178 generally prevents lateral movement of the base portion 112 relative to the countertop and relative to the base station 170, though the attraction is not so strong as to prevent the reader 100 from being picked up for handheld operation.

The induction coil 172 in the base station 170 is positioned proximate the base station top of the base station 170 and the induction coil 131 of the base portion 112 is positioned proximate the bottom surface 148, such that when the base portion 112 is positioned on the countertop over the base station 170, the electromagnetic field generated by the induction coil 172 in the base station 170 causes a current to be generated in the induction coil 131 in the base portion 112.

Figure 5C:
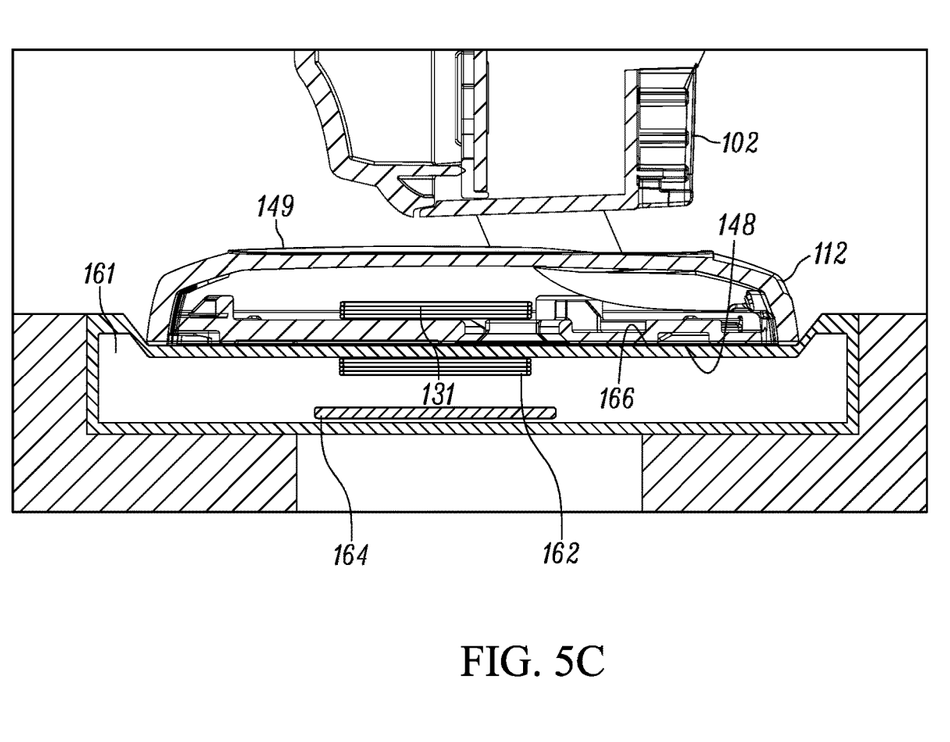
FIG. 5C is a cross-sectional side view of the reader of FIG. 1B with the embodiment of the base station of FIGS. 5A and 5B.

As seen in FIGS. 3, 4, 5A and 6, the first portion 148a of the bottom surface 148 of the base portion 112 is at an oblique angle relative to the centroidal axis 107 of the handle portion 104, though in the embodiment of FIG. 1B the handle portion 104 is omitted, and the first portion 148a of the bottom surface 148 of the base portion is perpendicular to the centroidal axis of the body 102 as seen in FIG. 5C. FIG. 5C depicts a reader 100 that omits the handle portion positioned within a base station 160, similar to that disclosed in FIGS. 5A and 5B.

Again, the base portion 112 has a bottom surface 148 and a top surface 149, where the bottom surface 148 extends along a single plane parallel to the base station surface 166. The bottom surface 148 and the base station surface 166 are each substantially flat in order to provide a stable interface between the base portion 112 and the base station 160. In at least one dimension, the bottom surface 148 spans the diameter of the base station surface 166 such that the flanged positioning feature 161 prevents lateral movement of the base portion, and aligns the induction coils 131, 162. The induction coil 162 in the base station 160 is positioned proximate the base station surface 166 and the induction coil 131 of the base portion 112 is positioned proximate the bottom surface 148, such that when the base portion 112 is positioned on the base station 160, the electromagnetic field generated by the induction coil 162 in the base station 160 causes a current to be generated in the induction coil 131 in the base portion 112. However, those of ordinary skill in the art should understand that the base 112 of the reader 100 without the handle portion 104 as shown in FIG. 1B may be modified as in any of the examples described above to work with any of the base stations 140, 150, 160, 170 described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An arrangement comprising:
    a barcode reader including:
        a head portion housing an imaging assembly, the imaging assembly having a field of view (FOV) with a central FOV axis;
        a handle portion extending along a centroidal axis, the centroidal axis being obliquely angled relative to the central FOV axis; and
        a base portion connected to the head portion via the handle portion, the base portion having a top surface and a bottom surface, the top surface being closer to the head portion than the bottom surface, wherein at least a first portion of the bottom surface is substantially flat and extends along a first plane, wherein the centroidal axis of the handle portion is obliquely angled relative to the first plane, and wherein the base portion houses a first induction coil positioned proximate a second portion of the bottom surface, the first induction coil being electrically coupled to a power storage component housed within the barcode reader; and a base station having a base station surface, wherein at least a first portion of the base station surface is substantially flat and extends along a second plane that is substantially parallel to the first plane, and wherein the base station houses a second induction coil positioned proximate a second portion of the base station surface, the second induction coil being electrically coupled to an electric power source, the base station further having a positioning feature, wherein the barcode reader is configured to rest on the base station such that the second portion of the bottom surface of the base portion is positioned in close enough proximity to the second portion of the base station surface to cause an electromagnetic field created by the second induction coil to induce a current in the first inductive coil, and wherein the barcode reader is further configured to rest on the base station such that the positioning feature on the base station: (i) constrains movement of the base portion of the barcode reader along the first plane, and (ii) permits rotation of the base portion of the barcode reader about a vertical axis, the vertical axis being substantially normal to the first plane.

2. The arrangement of claim 1, wherein the positioning feature comprises a flange which extends above the base station surface and encircles the base portion of the barcode reader when the barcode reader rests on the base station.

3. The arrangement of claim 1, wherein the positioning feature is configured to permit rotation of the base portion of the barcode reader about the vertical axis by less than 360 degrees.

4. The arrangement of claim 1, wherein the positioning feature is configured to permit rotation of the base portion of the barcode reader about the vertical axis by at least 45 degrees.

5. The arrangement of claim 1, wherein the first portion of the bottom surface of the base portion of the reader and the second portion of the bottom surface of the base portion are the same portion of the bottom surface.

6. The arrangement of claim 1, wherein the first portion of the base station surface and the second portion of the base station surface are the same portion of the base station surface.

7. The arrangement of claim 1, wherein the handle portion is removably attached to the base portion of the reader.

8. The arrangement of claim 1, wherein the base portion of the barcode reader further comprises a receiving positioning feature having a circular cross section in a plane substantially parallel with the first plane, and wherein the positioning feature of the base station comprises a protrusion having a circular cross section in a plane substantially in parallel with the second plane and is configured to interface with the receiving positioning feature of the base portion.

9. The arrangement of claim 1, wherein the base portion of the barcode reader further comprises a receiving positioning feature having a circular sector cross section in a plane substantially parallel with the first plane, and wherein the positioning feature of the base station comprises a protrusion having a circular sector cross section in a plane substantially in parallel with the second plane and is configured to interface with the receiving positioning feature of the base portion.

10. The arrangement of claim 1, wherein the base station further comprises a gimbal on a second surface of the base station, the gimbal configured to allow the barcode reader to be hand-tilted relative to a table portion while the barcode reader remains rested on the base station.

11. The arrangement of claim 1, wherein the base station further comprises a base station body configured to house the second induction coil and a flange portion which extends from the base station surface substantially parallel to the second plane to retain the base station within an opening in a workstation surface, the flange portion configured to be positioned over or under the workstation surface.

12. The arrangement of claim 11, wherein the base station is retained below the workstation surface with one or more mechanical fasteners.

13. The arrangement of claim 1, wherein the base station is communicatively coupled to a host computing system and configured to act as a gateway between the host computing system and the barcode reader.

14. The arrangement of claim 1, wherein the power storage component comprises at least one of a battery and a capacitor.

15. The arrangement of claim 1, wherein the base station further comprises an alignment feature configured to align the first and second induction coils, the alignment feature being a magnetic material, and wherein the base portion further comprises a receiving alignment feature, the receiving alignment feature being a ferromagnetic material.

16. A method of charging and operating a barcode reader in a resting state within a base station, the barcode reader having: i) a base portion having a bottom surface, wherein at least a first portion of the bottom surface is substantially flat and extends along a first plane, and ii) a first induction coil positioned proximate a second portion of the bottom surface, the first induction coil being electrically coupled to a power storage component housed within the barcode reader, and the base station having: i) a base station surface, wherein at least a first portion of the base station surface is substantially flat and extends along a second plane that is substantially parallel to the first plane, ii) a second induction coil positioned proximate a second portion of the base station surface, the second induction coil being electrically coupled to an electric power source, and iii) a positioning feature, the method comprising:

positioning the second portion of the bottom surface of the barcode reader in close enough proximity to the second portion of the base station surface to cause an electromagnetic field created by the second induction coil to induce a current in the first induction coil;

constraining movement of the barcode reader along the first plane via an interface between the barcode reader and the positioning feature of the base station;

permitting rotation of the barcode reader about a vertical axis via the interface between the barcode reader and the positioning feature of the base station, the vertical axis being substantially normal to the first plane; and capturing at least one of: light reflected from a symbol and light emitted from the symbol via an imaging assembly of the barcode reader.

17. The method of claim 16, wherein the positioning feature comprises a flange which extends above the base station surface and encircles the base portion of the barcode reader in the resting state, and wherein constraining movement of the barcode reader comprises encircling the base portion of the barcode reader via the flange.

18. The method of claim 16, wherein permitting rotation of the barcode reader comprises permitting rotation of the base portion of the barcode reader about the vertical axis by less than 360 degrees.

19. The method of claim 16, wherein permitting rotation of the barcode reader comprises permitting rotation of the base portion of the barcode reader about the vertical axis by at least 45 degrees.

20. The method of claim 16, wherein the barcode reader further comprises: iii) a head portion housing an imaging assembly, the imaging assembly having a field of view (FOV) with a central FOV axis, and iv) a handle portion extending along a centroidal axis, the centroidal axis being obliquely angled relative to the central FOV axis, wherein the head portion is removably attached to the base portion via the handle portion, and wherein the centroidal axis of the handle portion is obliquely angled relative to the first plane, the method further comprising:
   removing the handle portion from the base portion of the reader; and
   capturing at least one of: light reflected from a symbol and light emitted from the symbol via an imaging assembly of the barcode reader while the handle portion is removed from the base portion of the reader.

21. The method of claim 16, wherein the base portion of the barcode reader further comprises a receiving positioning feature having a circular cross section in a plane substantially parallel with the first plane, and wherein the positioning feature of the base station comprises a protrusion having a circular cross section in a plane substantially in parallel with the second plane, the method further comprising:
   interfacing the protrusion of the positioning feature of the base station with the receiving positioning feature of the base portion,
   wherein permitting rotation of the barcode reader comprises permitting rotation of the base portion of the barcode reader about the vertical axis by 360 degrees.

22. The method of claim 16, wherein the base portion of the barcode reader further comprises a receiving positioning feature having a circular sector cross section in a plane substantially parallel with the first plane, and wherein the positioning feature of the base station comprises a protrusion having a circular sector cross section in a plane substantially in parallel with the second plane, the method further comprising:
   interfacing the protrusion of the positioning feature of the base station with the receiving positioning feature of the base portion,
   wherein permitting rotation of the barcode reader comprises permitting rotation of the base portion of the barcode reader about the vertical axis by less than 360 degrees.

23. The method of claim 16, wherein the base station further comprises a gimbal on a second surface of the base station, the method further comprising:
   tilting, via the gimbal, the barcode reader relative to a table portion in the resting state.

24. The method of claim 16, wherein the base station is communicatively coupled to a host computing system and configured to act as a gateway between the host computing system and the barcode reader.

25. The method of claim 16, wherein the power storage component comprises at least one of a battery and a capacitor.

26. The method of claim 16, wherein the base station further comprises an alignment feature configured to align the first and second induction coils, the alignment feature being a magnetic material, and wherein the base portion further comprises a receiving alignment feature, the receiving alignment feature being a ferromagnetic material, the method further comprising:
   aligning, via the alignment feature, the first induction coil with the second induction coil.

27. An arrangement comprising:
   a barcode reader including:
      a body portion having a front side with a window, a rear side opposite the front side and two lateral sides, the body portion housing an imaging assembly, the imaging assembly having a field of view (FOV) with a central FOV axis extending through the window; and
      a base portion connected to the body portion, the base portion having a top surface and a bottom surface, the top surface being closer to the body portion than the bottom surface, wherein at least a first portion of the bottom surface is substantially flat and extends along a first plane, and wherein the base portion houses a first induction coil positioned proximate a second portion of the bottom surface, the first induction coil being electrically coupled to a power storage component housed within the barcode reader; and
   a base station having a base station surface, wherein at least a first portion of the base station surface is substantially flat and extends along a second plane that is substantially parallel to the first plane, and wherein the base station houses a second induction coil positioned proximate a second portion of the base station surface, the second induction coil being electrically coupled to an electric power source, the base station further having a positioning feature,
   wherein the barcode reader is configured to rest on the base station such that the second portion of the bottom surface of the base portion is positioned in close enough proximity to the second portion of the base station surface to cause an electromagnetic field created by the second induction coil to induce a current in the first inductive coil, and
   wherein the barcode reader is further configured to rest on the base station such that the positioning feature on the base station: (i) constrains movement of the base portion of the barcode reader along the first plane, and (ii) permits rotation of the base portion of the barcode reader about a vertical axis, the vertical axis being substantially normal to the first plane.

28. The arrangement of claim 27, wherein the two lateral sides of the body portion are configured to be grasped.

29. The arrangement of claim 28, wherein the front and rear sides of the body portion have a width equal to or greater than a width of the lateral sides of the body portion.

30. The arrangement of claim 27, wherein the positioning feature comprises a flange which extends above the base station surface and encircles the base portion of the barcode reader when the barcode reader rests on the base station.

31. The arrangement of claim 27, wherein the positioning feature is configured to permit rotation of the base portion of the barcode reader about the vertical axis by less than 360 degrees.

32. The arrangement of claim 27, wherein the positioning feature is configured to permit rotation of the base portion of the barcode reader about the vertical axis by at least 45 degrees.

33. The arrangement of claim 27, wherein the first portion of the bottom surface of the base portion of the reader and the second portion of the bottom surface of the base portion are the same portion of the bottom surface.

34. The arrangement of claim 27, wherein the first portion of the base station surface and the second portion of the base station surface are the same portion of the base station surface.

35. The arrangement of claim 27, wherein the body portion of the barcode reader is configured to be tilted relative to the base portion of the barcode reader.

36. The arrangement of claim 27, wherein the base portion of the barcode reader further comprises a receiving positioning feature having a circular cross section in a plane substantially parallel with the first plane, and wherein the positioning feature of the base station comprises a protrusion having a circular cross section in a plane substantially in parallel with the second plane and is configured to interface with the receiving positioning feature of the base portion.

37. The arrangement of claim 27, wherein the base portion of the barcode reader further comprises a receiving positioning feature having a circular sector cross section in a plane substantially parallel with the first plane, and wherein the positioning feature of the base station comprises a protrusion having a circular sector cross section in a plane substantially in parallel with the second plane and is configured to interface with the receiving positioning feature of the base portion.

38. The arrangement of claim 27, wherein the base station further comprises a gimbal on a second surface of the base station, the gimbal configured to allow the barcode reader to be hand-tilted relative to a table portion while the barcode reader remains rested on the base station.

39. The arrangement of claim 27, wherein the base station further comprises a base station body configured to house the second induction coil and a flange portion which extends from the base station surface substantially parallel to the second plane to retain the base station within an opening in a workstation surface, the flange portion configured to be positioned over or under the workstation surface.

40. The arrangement of claim 39, wherein the base station is retained below the workstation surface with one or more mechanical fasteners.

41. The arrangement of claim 27, wherein the base station is communicatively coupled to a host computing system and configured to act as a gateway between the host computing system and the barcode reader.

42. The arrangement of claim 27, wherein the power storage component comprises at least one of a battery and a capacitor.

43. The arrangement of claim 27, wherein the base station further comprises an alignment feature configured to align the first and second induction coils, the alignment feature being a magnetic material, and wherein the base portion further comprises a receiving alignment feature, the receiving alignment feature being a ferromagnetic material.

* * * * *